(12) United States Patent
El Mezeni

(10) Patent No.: US 10,074,162 B2
(45) Date of Patent: Sep. 11, 2018

(54) BRIGHTNESS CONTROL FOR SPATIALLY ADAPTIVE TONE MAPPING OF HIGH DYNAMIC RANGE (HDR) IMAGES

(71) Applicant: INTEL CORPORATION, Santa Clara, CA (US)

(72) Inventor: Dragomir El Mezeni, Belgrade (IE)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 15/234,377

(22) Filed: Aug. 11, 2016

(65) Prior Publication Data

US 2018/0047141 A1    Feb. 15, 2018

(51) Int. Cl.
| | |
|---|---|
| *G06K 9/40* | (2006.01) |
| *G06T 5/00* | (2006.01) |
| *G06T 3/40* | (2006.01) |
| *G09G 3/20* | (2006.01) |

(52) U.S. Cl.
CPC ............ *G06T 5/007* (2013.01); *G06T 3/40* (2013.01); *G09G 3/2007* (2013.01); *G06T 2207/20208* (2013.01); *G09G 2300/0465* (2013.01)

(58) Field of Classification Search
USPC .................................. 345/589; 382/162, 166
See application file for complete search history.

(56) References Cited

U.S. PATENT DOCUMENTS

| | | |
|---|---|---|
| 5,455,874 A | 10/1995 | Ormsby et al. |
| 7,031,549 B2 | 4/2006 | Luo |
| | (Continued) | |

FOREIGN PATENT DOCUMENTS

| | | |
|---|---|---|
| KR | 1020130004708 A | 1/2013 |
| WO | 2015077329 A1 | 5/2015 |

OTHER PUBLICATIONS

Zhou et al., "Tone mapping method based on edge preservative total variation model", machine-translated Chinese patent publication CN102938837 A, published Feb. 20, 2013.*

(Continued)

*Primary Examiner* — Xuemei Chen
(74) *Attorney, Agent, or Firm* — Finch & Maloney PLLC

(57) ABSTRACT

Techniques are provided for spatially adaptive tone mapping with dynamic brightness control. A methodology implementing the techniques according to an embodiment includes converting luminance data, from a received HDR image, to a logarithm domain and decomposing the converted data into a base layer, and one or more detail layers. The method also includes adjusting the layers, through shifting and scaling of the base layer and scaling of the detail layers, to map the amplitude data into a selected range. The method further includes converting the adjusted layers from the logarithm domain to a linear domain and calculating a tone compression parameter based on statistics of the adjusted log domain base layer. The statistics are associated with brightness of the received image. The method further includes applying a global tone compression function, based on the tone compression parameter, to the converted linear domain base layer to generate compressed linear domain layers.

26 Claims, 13 Drawing Sheets
(6 of 13 Drawing Sheet(s) Filed in Color)

(56) References Cited

U.S. PATENT DOCUMENTS

| | | | | |
|---|---|---|---|---|
| 7,433,514 | B2* | 10/2008 | Sloan | G06T 5/009 |
| | | | | 382/162 |
| 7,639,893 | B2* | 12/2009 | Duan | G06T 5/007 |
| | | | | 345/589 |
| 7,933,454 | B2 | 4/2011 | Bressan et al. | |
| 8,330,768 | B2* | 12/2012 | Mantiuk | H04N 1/6027 |
| | | | | 345/589 |
| 8,406,569 | B2 | 3/2013 | Segall et al. | |
| 8,515,167 | B2* | 8/2013 | Yuan | H04N 19/30 |
| | | | | 382/166 |
| 8,577,169 | B2* | 11/2013 | Andrus | H04N 5/213 |
| | | | | 382/166 |
| 8,737,474 | B2 | 5/2014 | Gao et al. | |
| 8,798,149 | B2 | 8/2014 | Wu et al. | |
| 8,995,525 | B2 | 3/2015 | Wiegand et al. | |
| 9,076,224 | B1* | 7/2015 | Shah | G06T 5/009 |
| 9,105,078 | B2 | 8/2015 | Lim | |
| 9,390,484 | B2* | 7/2016 | Paris | H04N 19/30 |
| 9,497,456 | B2* | 11/2016 | Su | H04N 19/30 |
| 9,501,818 | B2* | 11/2016 | Ward | G06T 5/40 |
| 9,621,767 | B1* | 4/2017 | El Mezeni | H04N 19/186 |
| 9,654,755 | B2* | 5/2017 | Wallace | H04N 9/68 |
| 2009/0041376 | A1 | 2/2009 | Carletta et al. | |
| 2010/0183071 | A1 | 7/2010 | Segall | |
| 2012/0113130 | A1 | 5/2012 | Zhai | |
| 2013/0335438 | A1 | 12/2013 | Ward | |
| 2014/0219333 | A1 | 8/2014 | Xu et al. | |
| 2014/0341468 | A1 | 11/2014 | Paris | |
| 2016/0027160 | A1 | 1/2016 | Aydin et al. | |
| 2016/0205405 | A1 | 7/2016 | Ten | |
| 2016/0286226 | A1 | 9/2016 | Ridge et al. | |
| 2017/0301095 | A1* | 10/2017 | Zhang | G06T 7/11 |

OTHER PUBLICATIONS

Schlick, Christopher, "Quantization Techniques for Visualization of High Dynamic Range Pictures", In Photorealistic Rendering Techniques, 1995, pp. 7-20.

Larson, G. W., et al., "A Visibility Matching Tone Reproduction Operator for High Dynamic Range Scenes", Visualization and Computer Graphics, IEEE Transactions, 1997, vol. 3, pp. 291-306.

Pattanaik, S., et al., "A Multiscale Model of Adaptation and Spatial Vision for Realistic Image Display", In Proceedings of the 25th annual conference on Computer graphics and interactivet echniques, 1998, pp. 287-298.

Tumblin, Jack and Turk, Greg, "LCIS: A Boundary Hierarchy for Detail-Preserving Contrast Reduction", In Proceedings of the 26th annual conference on Computer graphics and interactive techniques, 1999, pp. 83-90.

Durand, Fredo and Dorsey, Julie, "Fast Bilateral Filtering for the Display of High-Dynamic-Range Images", ACM transactions on graphics (TOG), 2002, vol. 21, pp. 257-266.

Fattal, R., et al., "Gradient Domain High Dynamic Range Compression", In ACM Transacations on Graphics(TOG), 2002, vol. 21, pp. 249-256.

Reinhard, E., et al., "Photographic Tone Reproduction for Digital Images", In ACM Transactions on Graphics (TOG), 2002, vol. 21, pp. 267-276.

Johnson, G. M. and Fairchild, M. D., "Rendering HDR Images", In Color and Imaging Conference, 2002, vol. 2003, pp. 36-41.

Drago, F. et al., "Adaptive Logarithmic Mapping for Displaying High Contrast Scenes", Eurographics, 2003, vol. 22, 9 pages.

Li, Y. et al., "Compressing and Companding High Dynamic Range Images with Subband Architectures", ACM transactions on graphics (TOG), 2005, vol. 24, pp. 836-844.

Meylan, Laurence, "High Dynamic Range Image Rendering With a Retinex-Based Adaptive Filter", IEEE Transactions on Image Processing, Sep. 2006, vol. 15, pp. 2820-2830.

Kuang, J. et al., "iCAM06: A refined image appearance model for HDR image rendering", Journal of Visual Communication & Image Representation, 2007, vol. 18, pp. 406-414.

Mantiuk, R. et al., "Display Adaptive Tone Mapping", In ACM Transactions on Graphics (TOG), 2008, vol. 27, p. 68.

Shimoyama, S. et al., "Local Adaptive Tone Mapping with Composite Multiple Gamma Functions", In Image Processing (ICIP), 2009, 16th IEEE International Conference on, pp. 3153-3156.

He, K. et al., "Guided Image Filtering", In Computer Vision—ECCV, 2010, pp. 1-14.

Boschetti, A. et al., "High Dynamic Range Image Tone Mapping Based on Local Histogram Equalization", In Multimedia and Expo (ICME), 2010 IEEE International Conference on, pp. 1130-1135.

Paris, S. et al., "Local Laplacian Filters: Edge-aware Image Processing with a Laplacian Pyramid", ACM Trans. Graph., 2011, vol. 30.4.

Ahn, H. et al., "Adaptive Local Tone Mapping Based on Retinex for High Dynamic Range Images", Consumer Electronics (ICCE), 2013 IEEE International Conference on, pp. 153-156.

Tan, L. et al., "A Retinex-Based Local Tone Mapping Algorithm Using L0 Smoothing Filter", Advances in Image and GraphicsTechnologies, Springer Berlin Heidelberg, 2014, pp. 40-47.

Lee, B. J. and Song, B. C., "Local Tone Mapping using Sub-band Decomposed Multi-scale Retinex for High Dynamic Range Images", Consumer Electronics (ICCE), 2014 IEEE International Conference on, pp. 125-128.

Zhang, E. et al., "A Novel Tone Mapping Method for High Dynamic Range Image by Incorporating Edge-Preserving Filter Into Method Based on Retinex", Applied Mathematics & Information Sciences, An International Journal, 2015, vol. 9, pp. 411-417.

Reinhard, Erik, "Parameter Estimation for Photographic Tone Reproduction", Journal of graphics tools, 2002, vol. 7, pp. 45-51.

International Search Report for International Patent Application No. PCT/US2016/051006, dated Dec. 23, 2016, 5 pages.

International Search Report for International Patent Application No. PCT/US2017/018373, dated May 26, 2017, 6 pages.

International Search Report dated Oct. 19, 2017 for International Patent Application No. PCT/US2017/041161, 4 pages.

Written Opinion of the International Searching Authority dated Oct. 19, 2017 for International Patent Application No. PCT/US2017/041161, 5 pages.

* cited by examiner

1002

1004

1102

1104

BRIGHTNESS CONTROL FOR SPATIALLY ADAPTIVE TONE MAPPING OF HIGH DYNAMIC RANGE (HDR) IMAGES

BACKGROUND

Cameras, and other imaging devices, with the capability to provide increasingly high dynamic range images, are becoming more widely available. Such HDR images are able to capture a wider range of luminosity or brightness than is possible with more traditional imaging devices and techniques. This can be useful when the subject matter of the photograph contains both extremely bright and extremely dark regions, such as, for example, a mixture of sunlit areas and shadowed areas. HDR imaging is sometimes accomplished by capturing multiple images of the same scene, each taken at narrow but varying exposure levels, and combining them into a composite image. HDR images may also be obtained with sensors that have greater dynamic range, and which can generate pixel values with an increased number of bits to represent that entire range, without losing detail through truncation of least significant bits. Currently, however, most display devices have much more limited dynamic range (e.g., low dynamic range or LDR), and are unable to reproduce such HDR images in a visually acceptable format. Attempts to display an HDR image on a standard LDR display typically results in regions of the image that are either washed out or blacked out, or both, with a resulting loss of image detail. Existing solutions to this problem attempt to reduce image contrast through either global or local tone (e.g., luminosity and/or color) mapping operations. Global operators apply the same mapping function to each image pixel and provide global contrast reduction, but typically suffer from loss of detail in the dark and bright areas of the image. Local operators, on the other hand, are better at preserving local image features such as details in bright and dark areas, but generally suffer from low global contrast and may introduce image artifacts such as halo effects. Additionally, local tone mapping operators are more computationally intensive and are generally not suitable for real-time applications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
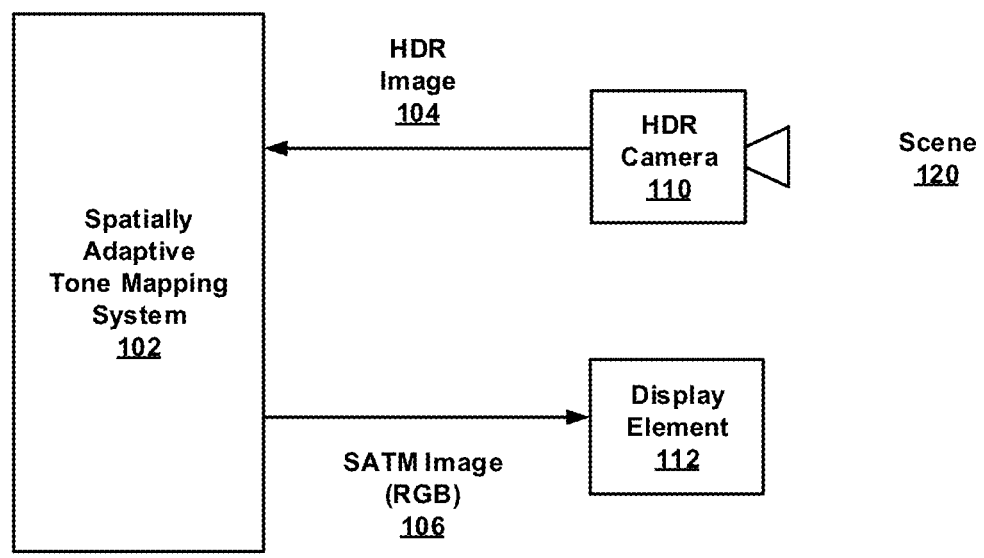
FIG. 1 is a top level diagram of a system implementation for spatially adaptive tone mapping (SATM) with dynamic brightness control, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for spatially adaptive tone mapping (SATM) with dynamic brightness and contrast control. The SATM processing allows for the display or reproduction of high dynamic range (HDR) images on display devices with lower dynamic range capability. SATM processing includes dynamic range compression operations that enable the preservation of image details, particularly in bright and dark regions of the image. The disclosed techniques include a pre-processing operation and a subsequent dynamic range compression operation, according to an example embodiment. The pre-processing operation is performed in the logarithmic domain and the subsequent dynamic range compression operation is performed in the linear domain. In the pre-processing operation, luminance data from the input HDR image is decomposed into a number of layers or planes (including, for example, a base layer, a small scale detail layer, and a large scale detail layer) of varying detail using a guided edge-aware filter that provides for relatively more efficient execution. The small scale detail layer and the large scale detail layer allow for improved control over image sharpness and local contrast of the output image. The base layer is partially compressed, and the details layers are enhanced using a spatially varying gain map configured to provide contrast boost in dark image areas. After conversion from the logarithmic domain to the linear domain, the base layer is further compressed using a log based tone compression function configured to dynamically adapt to statistics of the base layer to achieve improved contrast enhancement, and to preserve the details in both highlights and shadows by limiting the range of the compressed base layer. A dynamic tone compression parameter is calculated, for use in the log based tone compression function, to provide automated control of the degree of compression. The dynamic tone compression parameter calculation is based on statistics of the log domain data that are associated with image luminance (perceptible brightness) and contrast. The compressed layers are recombined through multiplication to generate compressed luminance data which may then be used to generate RGB data suitable for display.

The disclosed techniques can be implemented, for example, in a computing system or an image capture and processing system, or a software product executable or otherwise controllable by such systems. The techniques described herein provide for generally increased computational efficiency compared to existing local tone mapping methods and may therefore be suitable for use in real-time image processing implementations including the both still imaging and video applications, according to some embodiments. Additionally, the disclosed techniques for computing an automatic tone compression parameter provide improved results for images with that include regions of widely varying contrast. In a more general sense, the techniques can be implemented in hardware or software or a combination thereof. Numerous implementations will be apparent in light of this disclosure.

FIG. 1 is a top level diagram 100 of a system implementation for spatially adaptive tone mapping (SATM) with dynamic brightness control, configured in accordance with certain embodiments of the present disclosure. An HDR camera 110 is configured to capture high dynamic range images 104 of a scene 120. The HDR images 104 are provided to SATM system 102 which is configured to perform spatially adaptive tone mapping on the HDR image 104 and generate a processed image 106 suitable for display on a lower dynamic range display element 112 or other type of image reproduction device. In some embodiments, the processed image 106 may be a red-green-blue (RGB) image. The SATM system 102 is further configured to perform dynamic brightness and contrast control, as will be explained in greater detail below.

Figure 2:
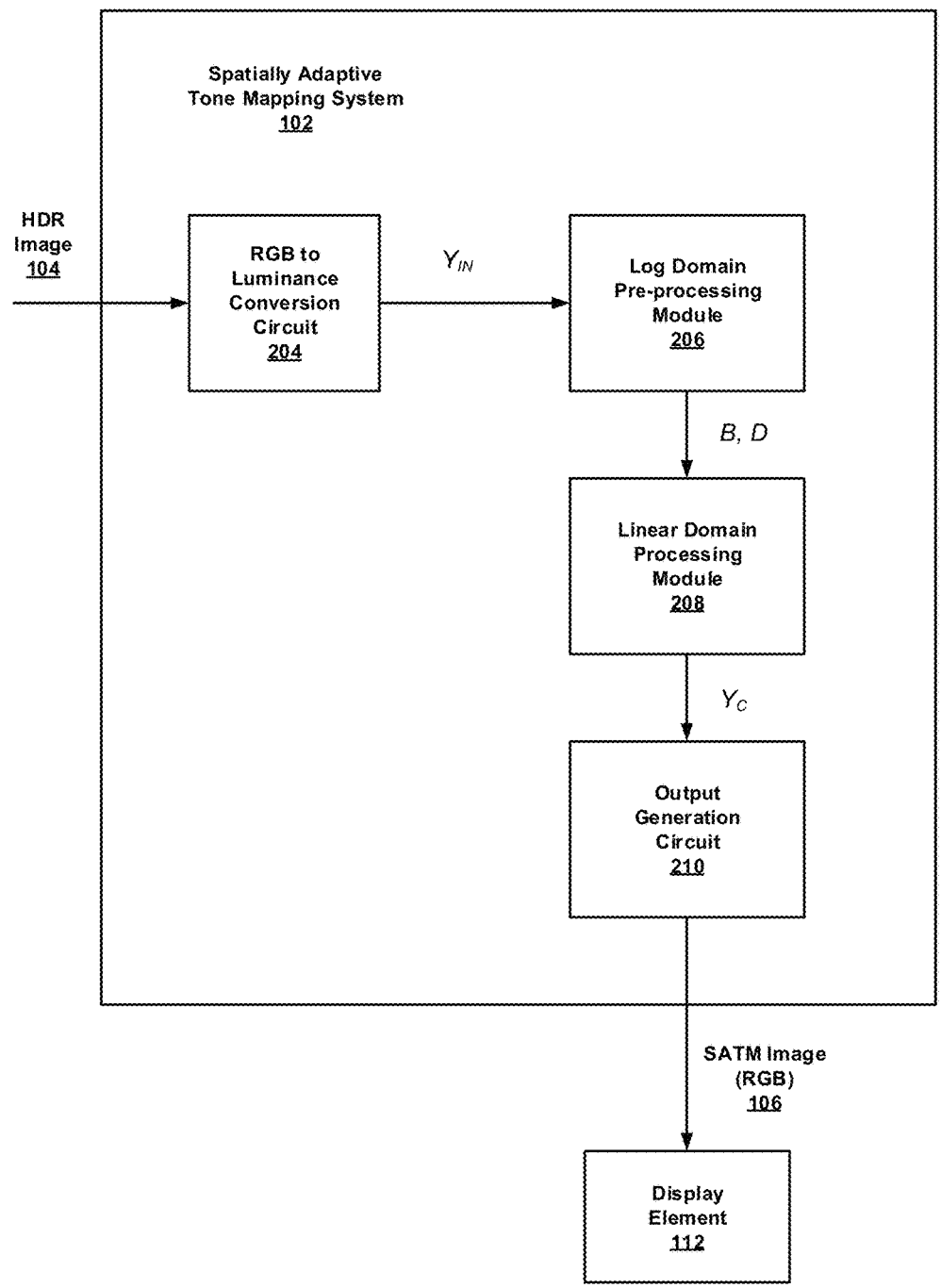
FIG. 2 is a more detailed block diagram of an SATM system, configured in accordance with certain embodiments of the present disclosure.

FIG. 2 is a more detailed block diagram of an SATM system 102, configured in accordance with certain embodiments of the present disclosure. The system 102 is shown to include an RGB to luminance conversion circuit 204, a log domain pre-processing module 206, a linear domain processing module 208 and an output generation circuit 210. The system 102 is configured to perform spatially adaptive tone mapping, with dynamic brightness control, on a received HDR image 104 and generate a processed image suitable for display on a lower dynamic range display element 112 or other type of image reproduction device.

The RGB to luminance conversion circuit 204 is configured to process the input or received HDR image 104, presented in a typical RGB format, to extract input luminance data $Y_{IN}$ for compression. Typically only the luminance data is compressed since it provides achromatic information that describes or represents the lighting levels of the image. The input RGB values for each image pixel are represented by a given number of bits for each color channel (RGB). HDR image RGB values generally comprise a greater numbers of bits than LDR images. The RGB channels may be normalized to a range of 0 to 1, where 1 represents a maximum pixel value associated with associated with a maximum allowable absolute light level. Luminance may then be calculated, for example, using an ITU-R BT.709 standard transform (or other suitable method):

$$Y_{IN}=0.2126 \cdot R+0.7152 \cdot G+0.0722 \cdot B$$

In some embodiments, the HDR image 104 is provided in a luminance/chrominance format, in which case the luminance channel will be readily available. Of course, image data may also be provided in other formats and other appropriate conversion techniques may be used in those cases.

The log domain pre-processing module 206 is configured to perform a pre-processing operation in the logarithm domain where the luminance data is decomposed into a number of layers or planes of varying detail (e.g., base layer, small scale detail layer and large scale detail layer) using a guided edge-aware filter. The base layer (B) is partially compressed, and the details layers (D) are enhanced using a spatially varying gain map configured to provide contrast boost in dark image areas. The log domain pre-processing module 206 will be described in greater detail in connection with FIG. 4.

The linear domain processing module 208 is configured to provide further compression, after conversion back to the linear domain, using a log based tone compression function configured to dynamically adapt to statistics of the base layer. The linear domain processing module 208 may then reconstruct compressed luminance data ($Y_C$) from the base and detail layers. The linear domain processing module 208 will be described in greater detail in connection with FIG. 5. The output generation circuit 210 is configured to convert the SATM compressed luminance data back to an RGB image, as will also be described below. The converted RGB image will be suitable for display on a conventional or LDR type display element 112.

Figure 3:
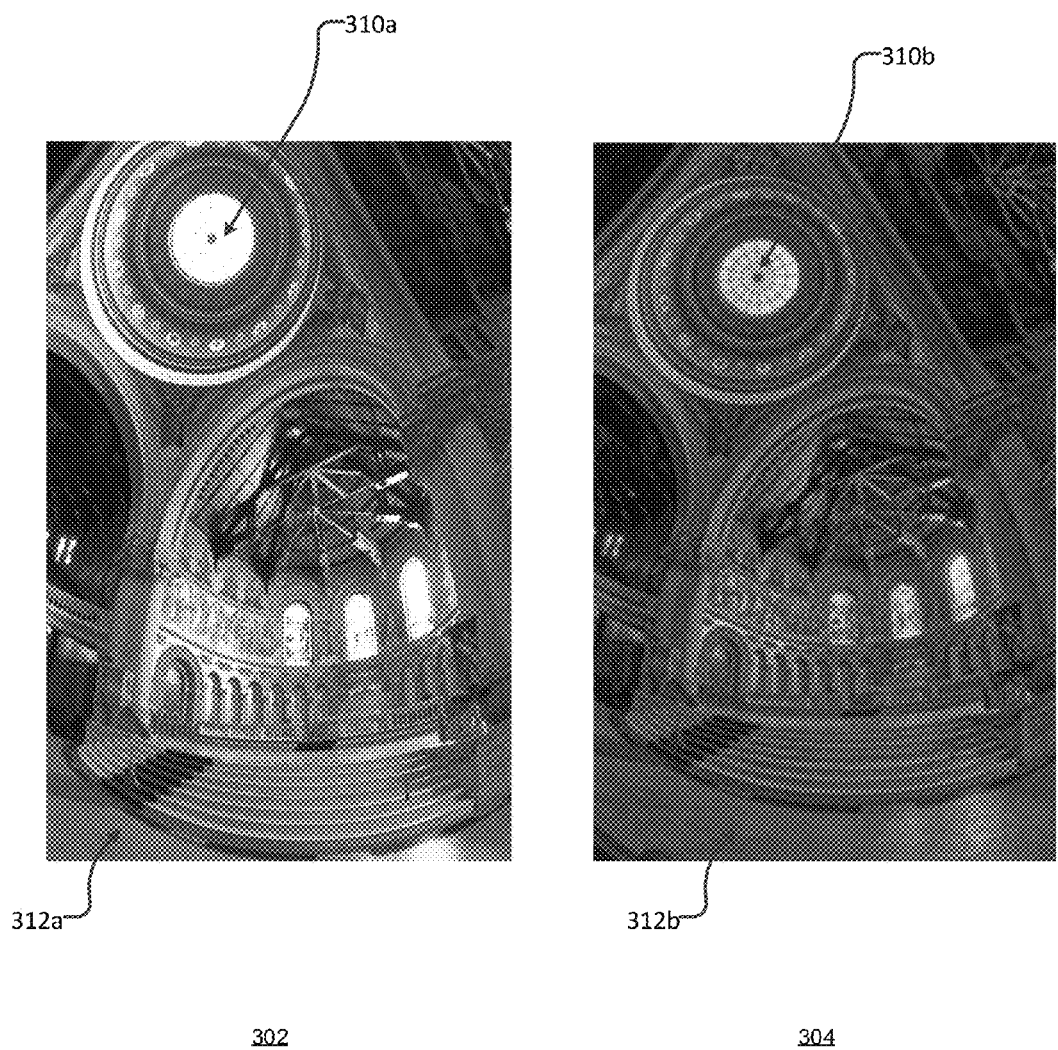
FIG. 3 illustrates image frames associated with processing by the SATM system, in accordance with certain embodiments of the present disclosure.

FIG. 3 illustrates image frames 300 associated with processing by the SATM system, in accordance with certain embodiments of the present disclosure. Image 302 illustrates an attempt to display an HDR image on a standard display or reproduction device without the benefit of tone mapping. As can be seen, image details are lost in areas of relatively extreme brightness, such as the windows 310a. Indeed, areas of only moderate brightness, such as the floor 312a suppress much of the detail in the tile flooring. In contrast, image 304 illustrates the results of processing based on the spatially adaptive tone mapping techniques described herein. An improvement can be seen in the detail visible in the window areas 310b and flooring 312b as well as in other areas.

Figure 4:
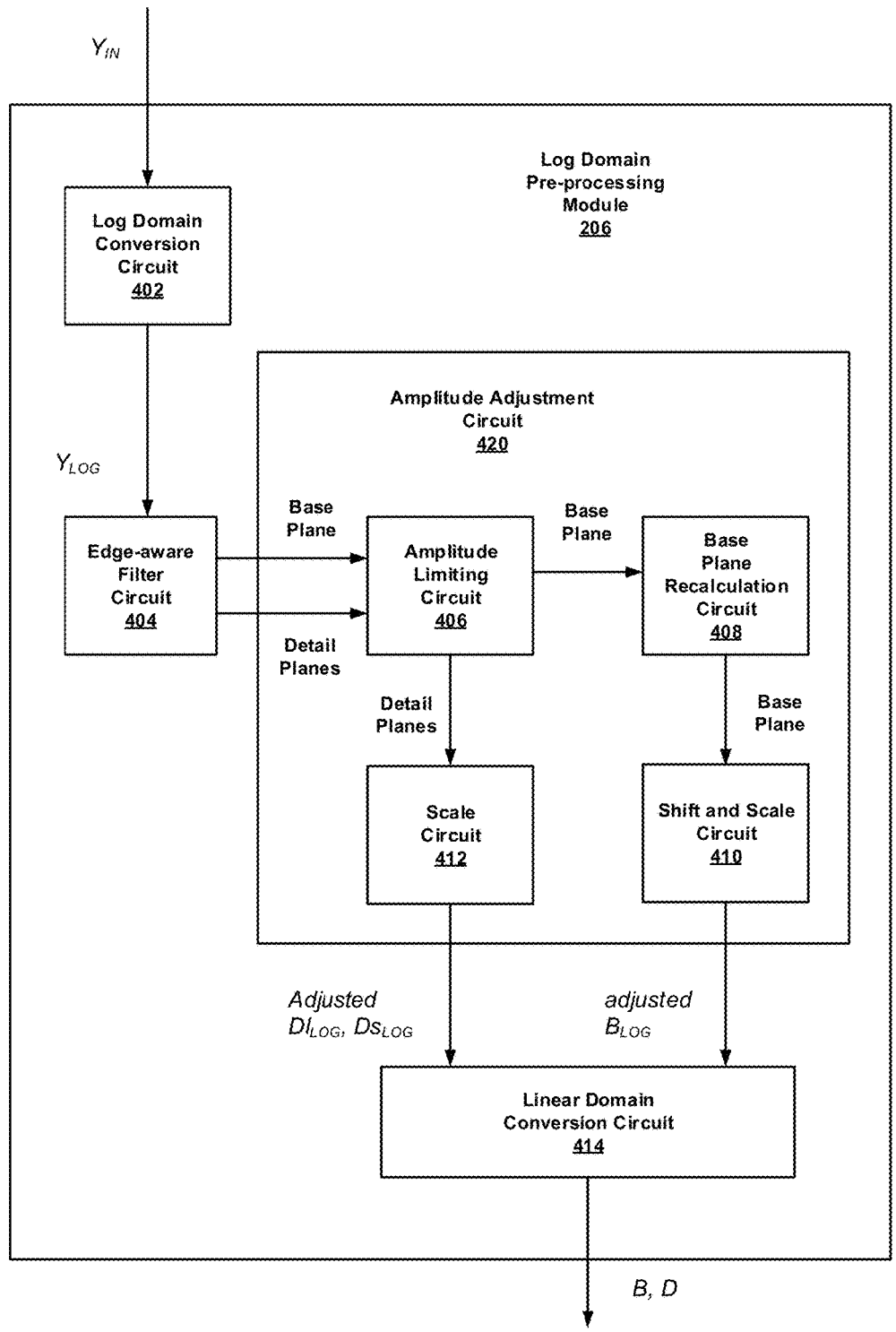
FIG. 4 is a more detailed block diagram of a log domain pre-processing module, configured in accordance with certain embodiments of the present disclosure.

FIG. 4 is a more detailed block diagram of a log domain pre-processing module 206, configured in accordance with certain embodiments of the present disclosure. The log domain pre-processing module 206 is shown to include a log domain conversion circuit 402, an edge-aware filter circuit 404, an amplitude adjustment circuit 420, and a linear domain conversion circuit 414. The amplitude adjustment circuit 420 is further shown to include an amplitude limiting circuit 406, a base plane recalculation circuit 408, a scaling circuit 412, and a shifting and scaling circuit 410.

Log domain conversion circuit 402 is configured to convert the input luminance data $Y_{IN}$, from a linear domain to a logarithm domain, for example according to the equation:

$$Y_{LOG}=\log_2(Y_{IN}+\varepsilon)$$

In a preferred embodiment, the logarithm operation is a base 2 log, although other log base values are possible. A small value, epsilon, may be added to the luminance data prior to performing the log operation to ensure that the argument to the logarithm is not equal to zero which is a mathematically undefined operation. The value of epsilon may be chosen to be small enough to have a negligible (e.g., visually imperceptible) effect on the results of the processing techniques described herein.

Edge-aware filter circuit 404 is configured to decompose the logarithm domain luminance data ($Y_{LOG}$) into a base layer ($B_{LOG}$), a small scale detail layer ($Ds_{LOG}$) and a large scale detail layer ($Dl_{LOG}$). In some embodiments, the edge-aware filter circuit is implemented as an edge-aware guided filter using known techniques in light of the present disclosure. The edge-aware guided filter may accept filter radius parameters, R, each of which is uniquely selected to generate the base layer, the small scale detail layer and the large scale detail layer. The length of the filter, L, is generally related to the selected radius R, for example L=2R+1. In some embodiments, small scale details may be associated with an image radius R in the range of 4 to 5 pixels; and large scale details associated with an image radius R in the range of 30 to 35, although other values are possible. In some embodiments, the filter length L for the large scale detail image region is typically selected to be approximately 6% of the smaller dimension of the input image (either width or height). It will be appreciated that the base layer is essentially a low-pass filtered (or blurred) version of the luminance data while the detailed layers are relatively more high-pass filtered versions.

The use of an edge-aware guided filter in the decomposition process may provide the best tradeoff between image quality and processing complexity. It generally provides better detail decomposition and is less prone to gradient reversals artifacts than bilateral filters and it is typically faster than other edge-aware approaches. It can be calculated relatively efficiently since it employs only 4 mean filtering (smoothing) functions which can be implemented in a processing time proportional to the image size (total number of pixels) and is independent of the filter size.

The small scale detail layer or plane ($Ds_{LOG}$) is obtained using the filter with a relatively small radius parameter, for example on the order of 4 to 5 pixels. Small details are associated with smaller scale or "micro" contrast and provide the sensation of image sharpness. The large scale detail layer or plane ($Dl_{LOG}$) is obtained using the filter with a relatively large radius parameter, for example on the order of 30 to 35 pixels. Large details provide information about larger features and illumination changes and they are generally responsible for local contrast. This separation into multiple layers provides additional control over detail enhancement. For example, local contrast can be increased by amplification of large details while avoiding over-sharpening by applying smaller gain to small details.

Amplitude limiting circuit 406 is configured to limit the amplitudes of the detail layers ($Ds_{LOG}$, $Dl_{LOG}$) to predefined values, dsLimit for small details and dlLimit for large details. The value of this limit restricts the level of detail which is allowed to be passed from input to the detail layers. Such detail limitations enable control over sudden transitions which can be caused by impulse noise, dead pixels, specular areas or gradient reversals. In some embodiments, amplitude limiting may be bypassed during implementation by setting the detail limit values to zero.

Base plane recalculation circuit 408 is configured to recalculate the base layer after the detail limitations are imposed by amplitude limiting circuit 406 to avoid any loss of information. The operations of the edge-aware filter circuit 404, amplitude limiting circuit 406 and base plane recalculation circuit 408, as described above, may be summarized by the following equations:

$$Bs_{LOG} = \text{guidedFilter}(Y_{LOG}, \text{radius}_{small}, \text{eps}_{small})$$

$$Ds_{LOG} = Y_{LOG} - Bs_{LOG}$$

$$Ds_{LOG} = \text{clip}(Ds_{LOG}, ds\text{Limit})$$

$$Bs_{LOG} = Y_{LOG} - Ds_{LOG}$$

$$B_{LOG} = \text{guidedFilter}(Bs_{LOG}, \text{radius}_{large}, \text{eps}_{large})$$

$$Dl_{LOG} = B_{LOG} - BS_{LOG}$$

$$Dl_{LOG} = \text{clip}(Dl_{LOG}, dl\text{Limit})$$

$$B_{LOG} = Bs_{LOG} - Dl_{LOG}$$

In the above equations, "guided filter" refers to the edge-aware filter circuit 404, "clip" refers to the amplitude limiting circuit 406 and the eps parameter is used to select a desired level of filter blurring (e.g., the filter cutoff frequency).

Scaling circuit 412 is configured to adjust the amplitudes of the data in the detail layers, and shifting and scaling circuit 410 is configured to adjust the amplitudes of the data in the base layers, such that they are mapped into a selected range of values, to achieve an initial log domain tone compression or contrast reduction. Contrast reduction performed in the logarithm domain is used to limit widely varying dynamic ranges of input images into a predefined range, as opposed to tone compression performed in the linear domain which may be used to adjust final appearance of the tone mapped image.

In some images, poor exposure settings and/or problematic transitions from absolute to relative luminance may result in a maximum relative luminance value that is less than unity in the linear domain (or equivalently, smaller than zero in the logarithm domain). This can result in inefficient usage of output pixel values, that is to say, not taking advantage of the entire range of available values. Shifting and scaling circuit 410 is configured to remap the base layer values to compensate for exposure errors and to place the largest log luminance value at zero. Scaling may thus ensure that a histogram of the log luminance data fits into a predefined contrast ratio. The following equation illustrates the calculation of the remapped log domain base layer, $\hat{B}_{LOG}$, where offset is the shift value and ratio is the scale factor.

$$\text{offset} = -\max(B_{LOG})$$

$$\text{ratio} = \frac{\text{targetRange}}{\max(B_{LOG}) - \min(B_{LOG})}$$

$$\hat{B}_{LOG} = \text{ratio} \cdot (B_{LOG} + \text{offset})$$

In some embodiments, targetRange, may be set to a value of approximately 5, generally corresponding to an exposure value (e.g., a photographic stop) of 5.

Scale circuit 412 is configured to enhance the detail layers in the logarithm domain by multiplying each of the detail planes with a gain factor providing spatially uniform detail processing. Since noise is addressed in the later stages of the image processing pipeline, additional detail boosting in dark areas may be added in this process. In some embodiments, additional spatially varying detail enhancement may be applied but may be limited to a factor of 2 since larger values can over exaggerate details. The limited range of the base layer, after log domain range compression, simplifies the creation of a variable gain map. For example, log domain range compression fits the base plane values into a range of [−5, 0] with the darkest pixels occupying the lower part of this range. If this base map is divided by −2.5 it provides a variable detail gain map where the largest gain is 2 in the darkest areas, ranging down to zero for larger luminance values. Detail suppression in bright areas may be avoided by clipping gain correction to a minimum value of 1.

Linear domain conversion circuit 414 is configured to convert the modified base and detail layers back to the linear domain by applying a base 2 exponentiation function, for example:

$$B = 2^{\hat{B}_{LOG}}$$

$$D = 2^{(\hat{D}_{lLOG} + \hat{D}_{sLOG})}$$

Figure 5:
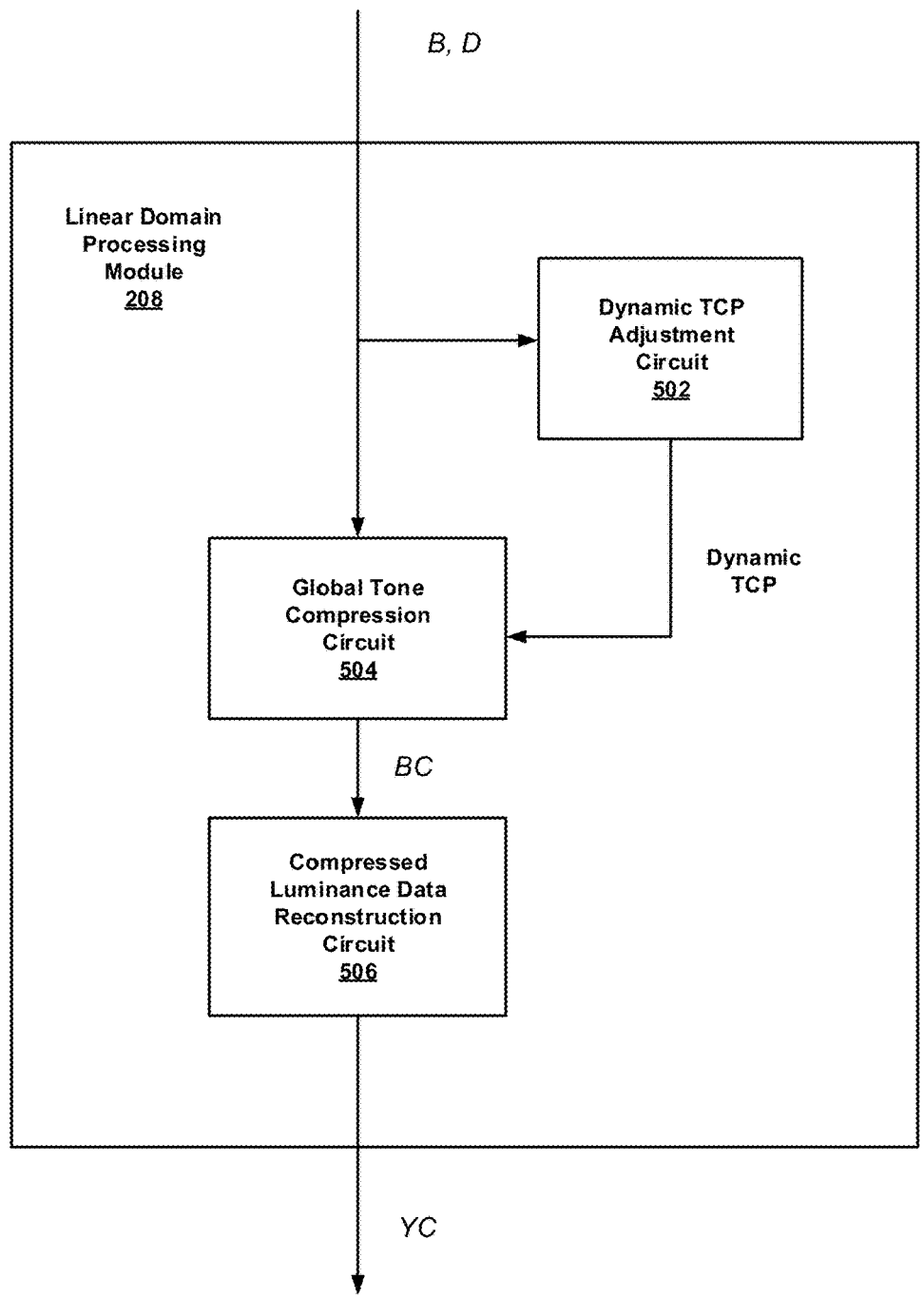
FIG. 5 is a more detailed block diagram of a linear domain processing module, configured in accordance with certain embodiments of the present disclosure.

FIG. 5 is a more detailed block diagram of a linear domain processing module 208, configured in accordance with certain embodiments of the present disclosure. The linear domain processing module 208 is shown to include a dynamic tone compression parameter (TCP) adjustment circuit 502, a global tone compression circuit 504, and a compressed luminance data reconstruction circuit 506.

Figure 6:
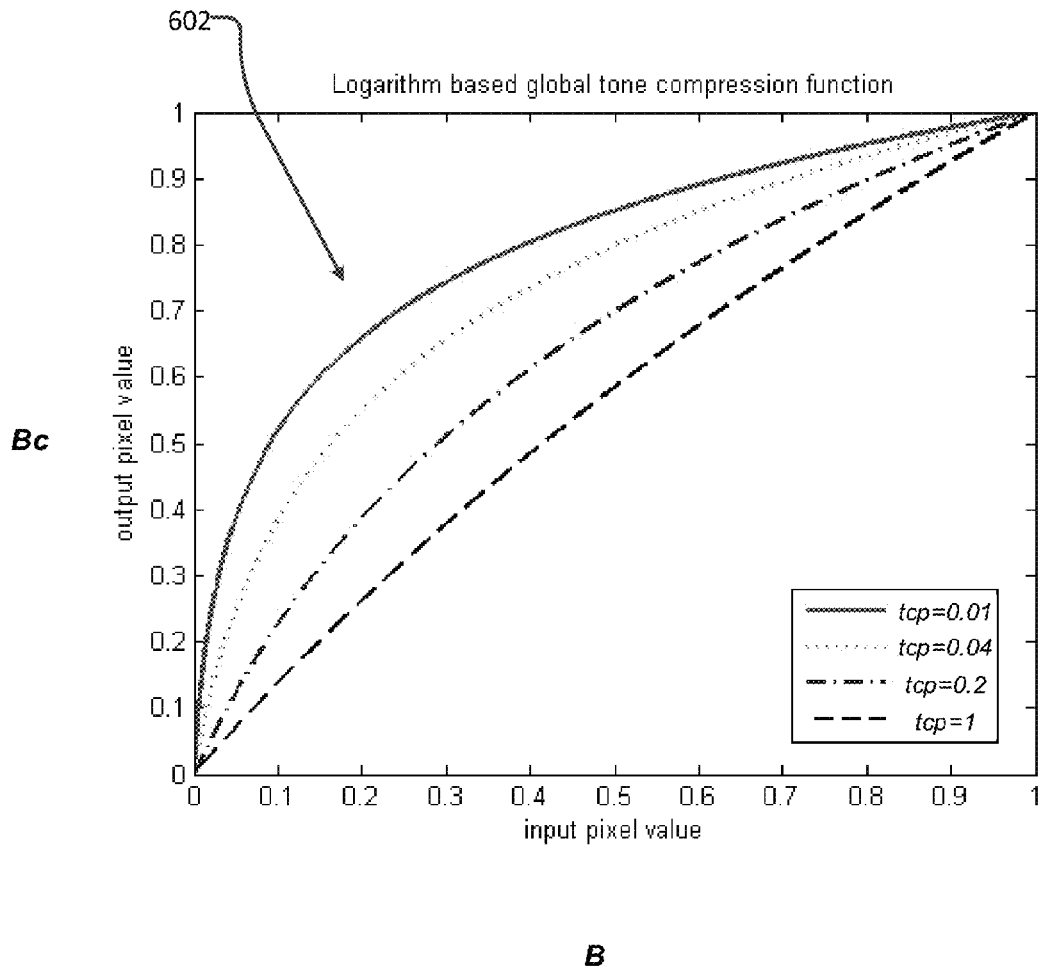
FIG. 6 illustrates a plot of example tone compression functions, in accordance with certain embodiments of the present disclosure.

Global tone compression circuit 504 is configured to apply further tone compression in the linear domain. After log domain processing, a histogram of the base layer in the linear domain may still have a relatively large peak associated with the lowest pixel values implying low contrast in shadow areas. Processing in the logarithm domain has placed the base layer histogram into a predefined range causing subsequent operations to be less sensitive to the dynamic range of the input image. An improvement in the displayable contrast can be achieved by applying any of the known global tone compression techniques, in light of the present disclosure. Some examples of known global tone compression functions include gamma, logarithmic and rational function tone compression. Since logarithmic tone compression complies with Weber-Fechner's law of just noticeable differences, the compressed base plane $B_c$ can be calculated using the following equation for logarithmic compression:

$$B_c = \frac{\log(B + tcp) - \log(tcp)}{\log(1 + tcp) - \log(tcp)}$$

where tcp is a parameter that controls the strength of the compression. FIG. 6 illustrates a family of tone compression curves for different values of tcp={0.01, 0.04, 0.2, 1}. In some embodiments, the parameter tcp may be adjusted by a user or operator of the system to fine tune the output image. In a preferred embodiment, however, dynamic TCP adjustment circuit 502 is configured to calculate a suitable value of tcp based on statistics of the adjusted log domain base layer, $\hat{B}_{LOG}$, that are associated brightness and/or contrast of the image, as will be explained below.

Compressed luminance data reconstruction circuit 506 is configured to combine the compressed base layer and details layer to a compressed luminance layer $Y_C$ through multiplication:

$$Y_C = B_C \cdot D$$

The output generation circuit 210 is configured to convert the compressed luminance layer $Y_C$ back to an RGB image suitable for display on a conventional or LDR type display element 112. The resulting tone mapped output image ($R_{OUT}$, $G_{OUT}$, $B_{OUT}$) may be generated from the input linear RGB values ($R_{IN}$, $G_{IN}$, $B_{IN}$), the input luminance values $Y_{IN}$ and the output compressed luminance, using known techniques in light of the present disclosure. For example a variation of Schlick's method with variable saturation parameter s and gamma correction factor γ may be used as follows:

$$R_{OUT} = Y_C \left(\frac{R_{IN}}{Y_{IN}}\right)^{\frac{s}{\gamma}}$$

$$G_{OUT} = Y_C \left(\frac{G_{IN}}{Y_{IN}}\right)^{\frac{s}{\gamma}}$$

$$B_{OUT} = Y_C \left(\frac{B_{IN}}{Y_{IN}}\right)^{\frac{s}{\gamma}}$$

The parameter γ represents the gamma correction factor needed for correct display of output images. The value of gamma depends on display properties and may be equal to 2.4 for standard RGB color space (sRGB) type devices.

FIG. 6 illustrates a plot 600 of example tone compression functions, in accordance with certain embodiments of the present disclosure. A family of logarithm based global tone compression curves 602 are shown for converting input pixel values (e.g., from a base plane B) to compressed output pixel values (e.g., for compressed base plane $B_C$). The degree of compression can be varied through selection of values for parameter tcp, for example, by TCP brightness adjustment circuit 702, with increasing compression corresponding to smaller values of tcp.

Figure 7:
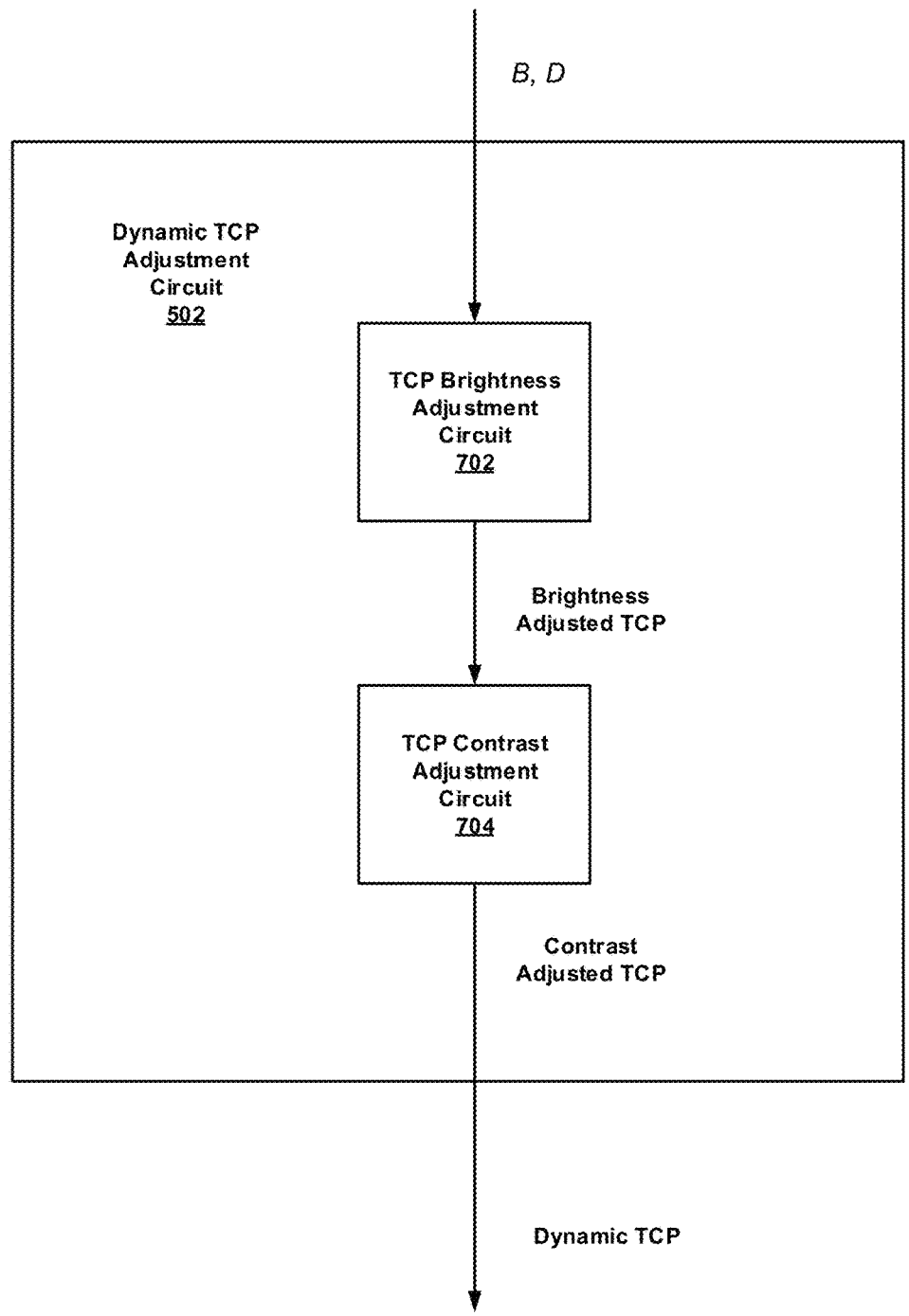
FIG. 7 is a more detailed block diagram of a dynamic tone compression parameter (TCP) adjustment circuit, configured in accordance with certain embodiments of the present disclosure.

FIG. 7 is a more detailed block diagram of a dynamic tone compression parameter (TCP) adjustment circuit 502, configured in accordance with certain embodiments of the present disclosure. The dynamic TCP adjustment circuit 502 is shown to include a TCP brightness adjustment circuit 702 and a TCP contrast adjustment circuit 704. At a high level, the dynamic TCP adjustment circuit 502 is configured to calculate a suitable value of tcp based on statistics of the adjusted log domain base layer, $\hat{B}_{LOG}$. These statistics may be associated brightness and/or contrast of the image. For example, the mean of $\hat{B}_{LOG}$ provides an indication of the degree of tone compression that may be required. A lower mean is associated with greater need for tone compression, and hence a smaller value of tcp, to pull details out of shadows and achieve satisfactory output brightness.

Imaged scenes can have varying degrees of contrast, however, and thus it is useful, in some embodiments, to additionally include global contrast information in the tcp calculation, based on statistics beyond just the mean. For example, scenes with large contrast differences may be associated with bimodal histograms such as the one illustrated in FIG. 8. This can tend to shift the mean log value, resulting in weaker tone compression which may leave shadowed areas of the image too dark. To overcome this problem, the tcp may be further increased in high contrast scenes.

The TCP brightness adjustment circuit 702 is configured to calculate tcp based on the mean (or average) of the adjusted log domain base layer, which is associated with brightness. Starting with a nominal tcp value of 0.6, chosen to provide generally acceptable results for most scene images, an adjustment is made to avoid over-compression of already bright scenes or to provide additional compression of relatively dark scenes. In some embodiments, the adjustment may be expressed as:

$$tcp_{BRIGHTNESS} = 10^{0.65(mean(\hat{B}_{LOG}) + 2.7)}$$

$tcp_{NOMINAL}=0.06$ $tcp=tcp_{NOMINAL}\cdot tcp_{BRIGHTNESS}$

Figure 10:
FIG. 10 illustrates an example of SATM processing with TCP adjustment for brightness, in accordance with certain embodiments of the present disclosure.
Figure 10:

In this case, the adjusted log domain base layer, $\hat{B}_{LOG}$, is assumed to be fitted to the range [−5, 0], and a nominal value of the mean of the adjusted log domain base layer is taken to be negative 2.7. The slope of 0.65 and the nominal mean value of −2.7 may be determined empirically (or through any other suitable method) to provide desired results for a wide variety of scenes. The use of an exponential weighting factor (e.g., with exponential base 10) provides for more uniform control. One example of image improvement resulting from SATM processing with application of the tcp adjustment for brightness, as described above, is shown in FIG. 10. The left image 1002 is produced with nominal tone compression while the right image 1004 is produced with the adjusted tcp using brightness-dependent modification. As can be seen, more detail is visible in the shadowed areas.

Figure 8:
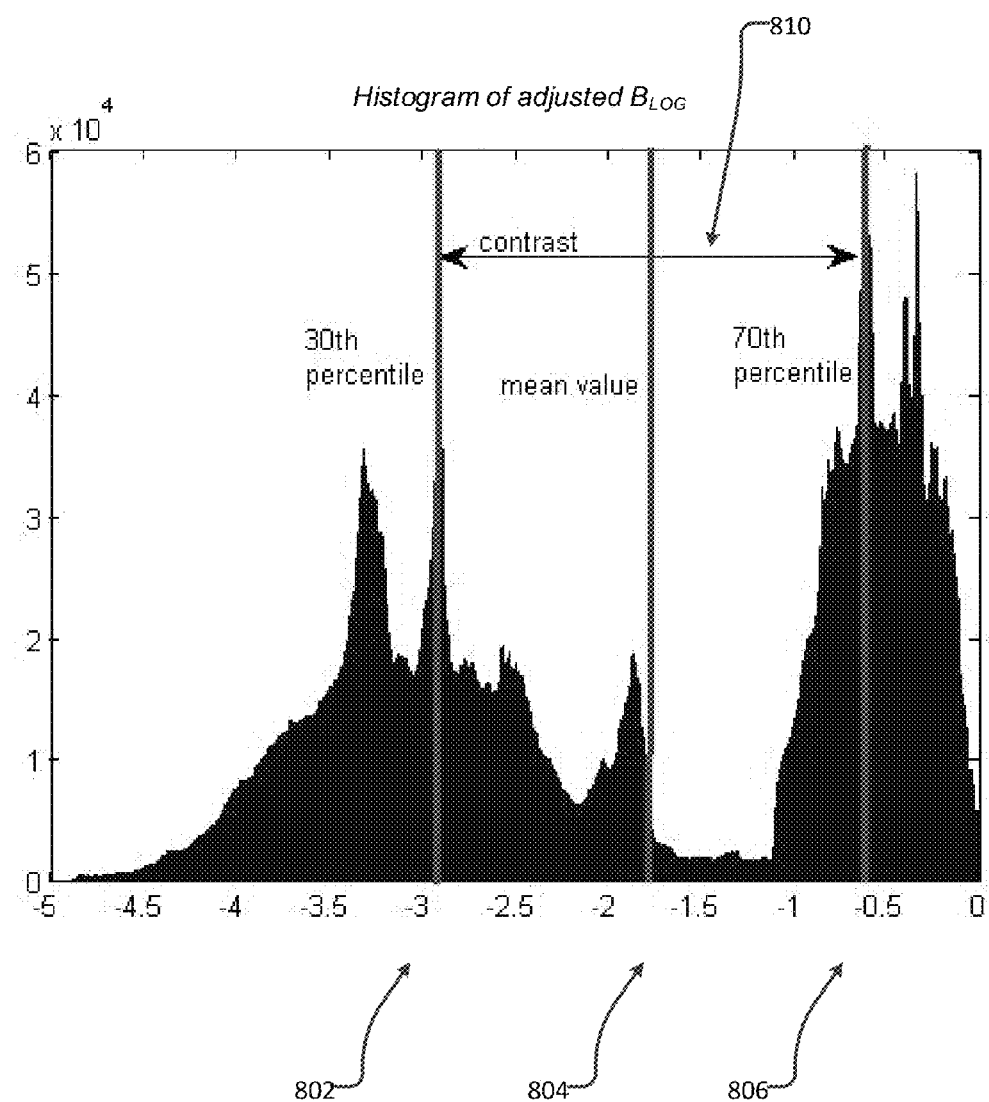
FIG. 8 illustrates an example histogram of an adjusted log domain base layer, in accordance with certain embodiments of the present disclosure.
Figure 11:
FIG. 11 illustrates an example of SATM processing with TCP adjustment for brightness and contrast, in accordance with certain embodiments of the present disclosure.
Figure 11:

The TCP contrast adjustment circuit 704 is configured to provide additional tcp adjustment based on statistics associated with image contrast. In some images with varying degrees of contrast, the histogram of the adjusted log domain base layer tends to be bi-modal. An example is illustrated in FIG. 8 which shows a mean value 804 of approximately −1.8 which is significantly larger than the nominal value of −2.7. The scene image has many pixels occupying the lower regions of the histogram range. According to the previously defined control algorithm goals, tone compression is suppressed for this scene, generating a tcp value of 0.2164 which produces a dark output image. In order to avoid this, the tcp value is further adjusted based on the scene contrast. In particular, scenes with greater contrast benefit from increased tone compression in order to reveal all details. For contrast determination, it is beneficial to discard outliers, and thus contrast 810 is defined as the difference between the 70th and 30th percentile (806, 802) of the adjusted log domain base layer:

$\text{contrast}=\text{percentile}(\hat{B}_{LOG},70)-\text{percentile}(\hat{B}_{LOG},30)$ $tcp_{CONTRAST}=10^{-0.4122(contrast-1)}$ $tcp=tcp_{NOMINAL}\cdot tcp_{BRIGHTNESS}\cdot tcp_{CONTRAST}$ A nominal contrast value of 1 and a slope parameter of −0.41 may be determined empirically (or through any other suitable method) to provide desired results for a wide variety of scenes. One example of image improvement resulting from SATM processing with application of the tcp adjustment for both brightness and contrast, as described above, is shown in FIG. 11. The left image 1102 is produced with brightness-dependent tone compression while the right image 1104 is produced with the adjusted tcp using both brightness and contrast dependent modification.

Figure 9:
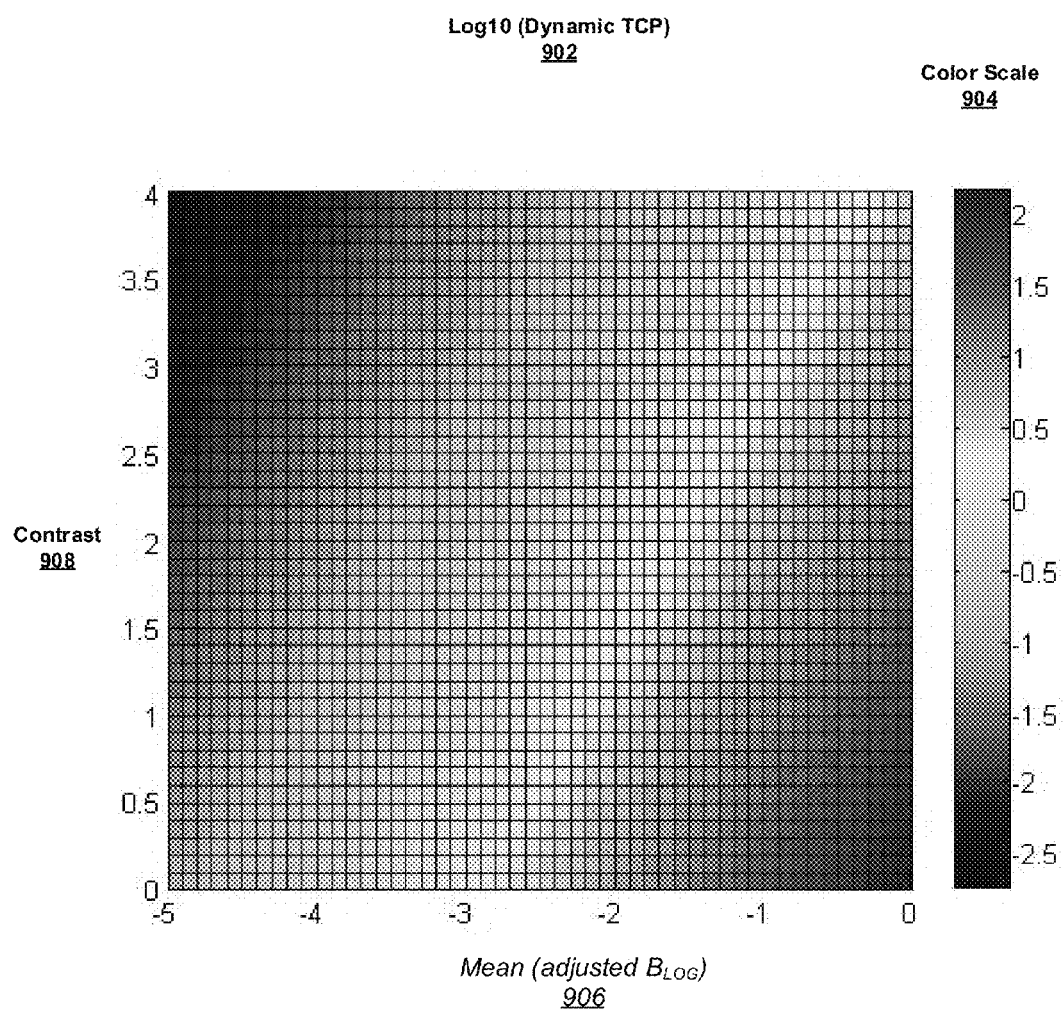
FIG. 9 illustrates an example dynamic TCP plot, in accordance with certain embodiments of the present disclosure.

FIG. 9 illustrates an example dynamic TCP plot 900, in accordance with certain embodiments of the present disclosure. A plot of the base 10 logarithm of the adjusted tcp 902 as a function of the mean of the adjusted log domain base layer 906 and of the contrast 908 is shown using a color representation scale 904.

Methodology

Figure 12:
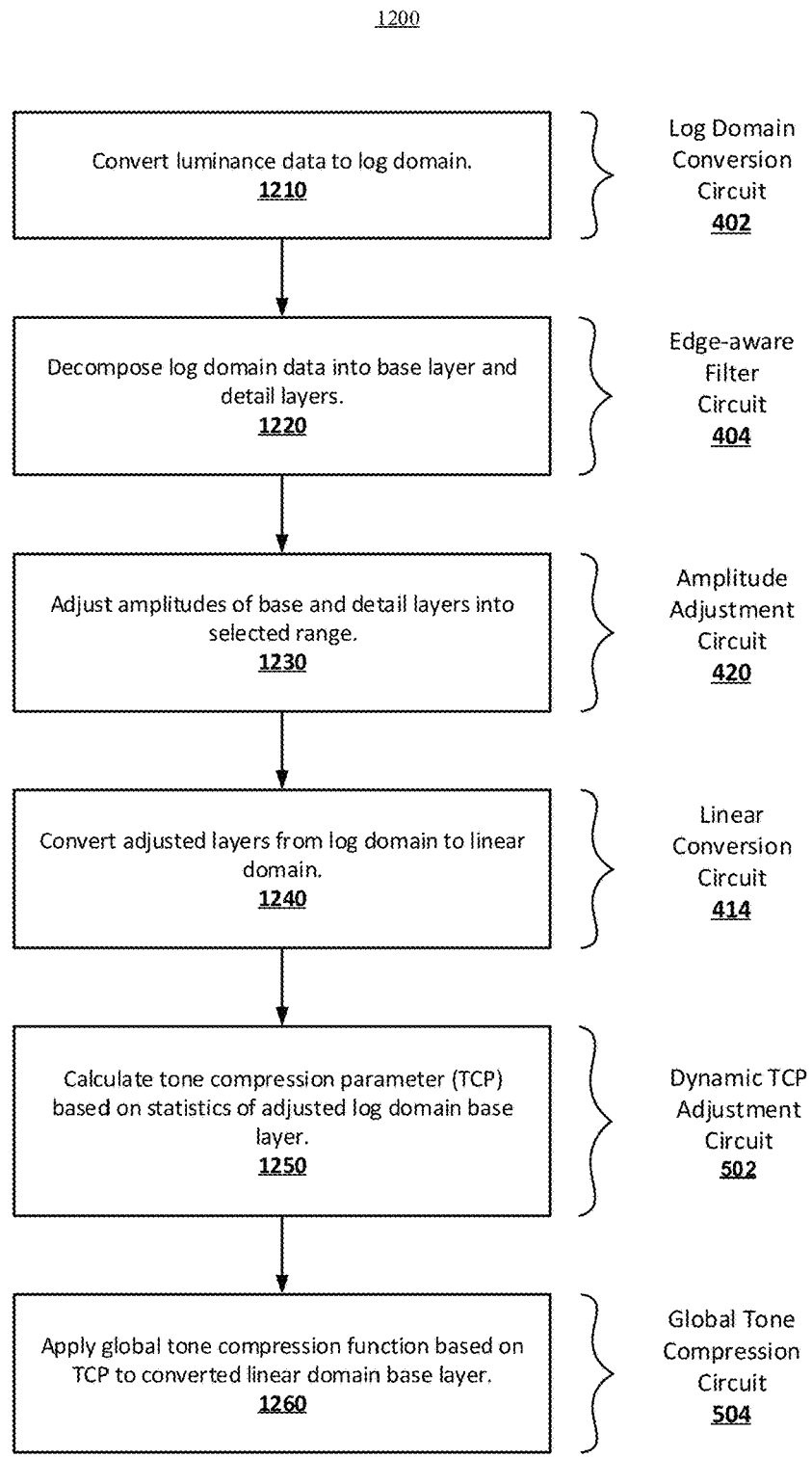
FIG. 12 is a flowchart illustrating a methodology for SATM with dynamic brightness control, in accordance with certain embodiments of the present disclosure.

FIG. 12 is a flowchart illustrating an example method 1200 for spatially adaptive tone mapping (SATM) with dynamic brightness and contrast control, in accordance with certain embodiments of the present disclosure. As can be seen, example method 1200 includes a number of phases and sub-processes, the sequence of which may vary from one embodiment to another. However, when considered in the aggregate, these phases and sub-processes form a process for SATM with dynamic brightness control in accordance with certain of the embodiments disclosed herein. These embodiments can be implemented, for example using the system architecture illustrated in FIGS. 2, 4, 5, and 7 described above. However other system architectures can be used in other embodiments, as will be apparent in light of this disclosure. To this end, the correlation of the various functions shown in FIG. 12 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 1200. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 12, in one embodiment, method 1200 for SATM with dynamic brightness and contrast control commences at operation 1210, by converting luminance data, associated with pixels from a received image, into the logarithm domain. The received image may be a High Dynamic Range (HDR) image, for example from an HDR camera or other suitable device capable of generating images with a dynamic range that exceeds the capabilities of typical display devices.

Next, at operation 1220, the logarithm domain luminance data is decomposed or separated out into a base layer and one or more detail layers (e.g., a small scale detail layer, and a large scale detail layer). In some embodiments, the decomposition is performed by an edge-aware guided filter, employing a unique filter radius parameter for each layer.

At operation 1230, the amplitudes of the data in each of the layers are adjusted to shift and scale the amplitudes of the base layer and to scale the amplitudes of the detail layers, into a selected range or mapping that enables the full gamut of data amplitudes to be relatively well represented in the dynamic range that will be available on the display device that is ultimately used to display the image.

At operation 1240, the adjusted layers are converted from the logarithm domain back to a linear domain, for example through application of a power of 2 exponentiation operation. At operation 1250, a tone compression parameter is calculated based on statistics of the adjusted log domain base layer. The statistics are associated with brightness and/or contrast of the received image. In some embodiments, the statistics associated with brightness are based on an average of samples of the adjusted log domain base layer, and the statistics associated with contrast are based on a difference between a selected upper percentile threshold and a selected lower percentile threshold of samples of the adjusted log domain base layer.

At operation 1260, a global tone compression function is applied to the converted linear domain base layer to generate compressed linear domain layers. The global tone compression function is based on the calculated tone compression parameter. In some embodiments, the global tone compression may be implemented as a gamma compression function, a logarithmic compression function or a rational function compression.

Of course, in some embodiments, additional operations may be performed, as previously described in connection with the system. For example, compressed luminance data is generated based on a multiplicative product of the compressed linear domain layers. Further additional operations may include, for example, generating a compressed output image based on scaling of the red-green-blue (RGB) data from the received image by a ratio of the compressed luminance data to the original luminance data from the received image.

Example System

Figure 13:
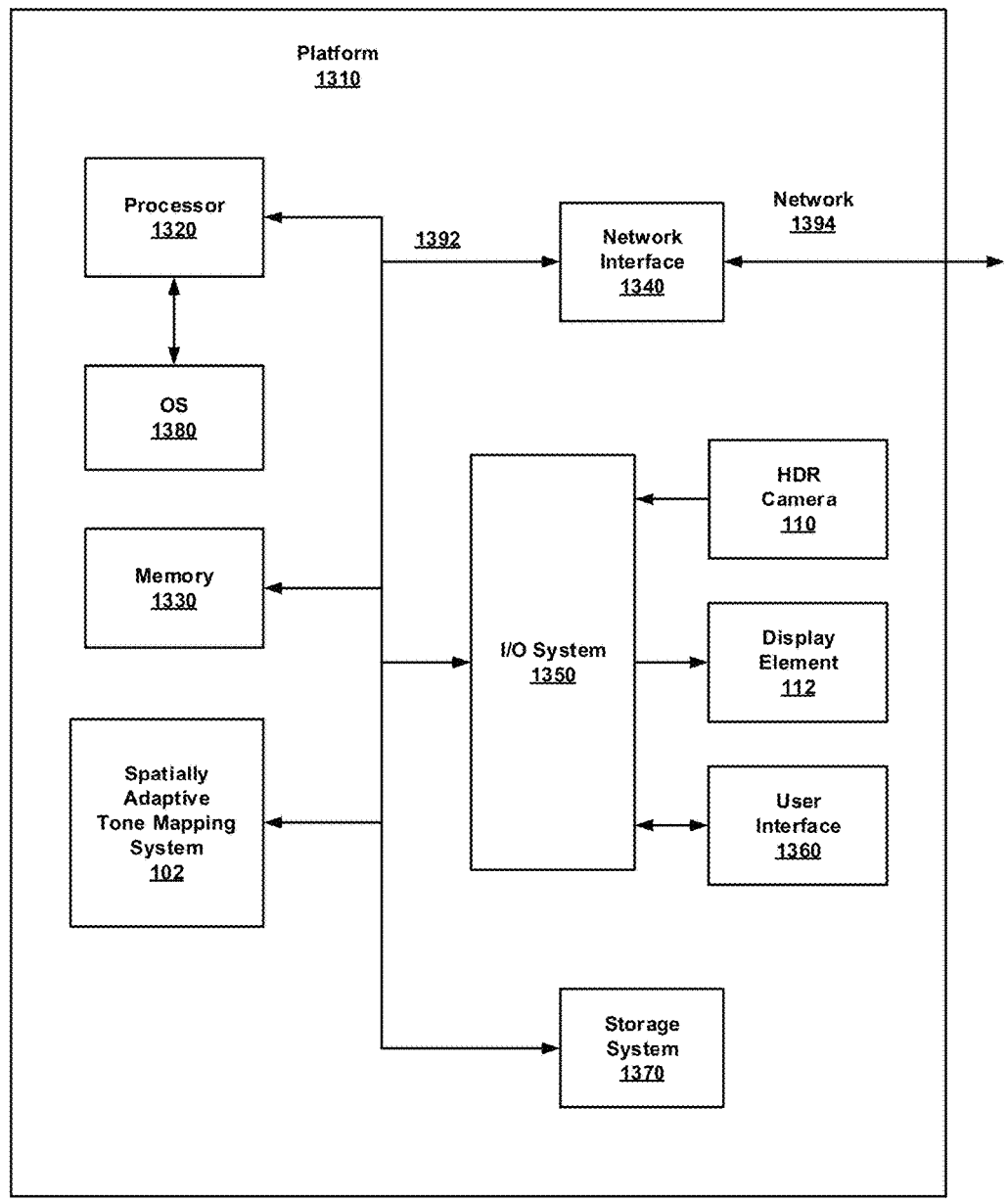
FIG. 13 is a block diagram schematically illustrating a system platform to perform SATM with dynamic brightness control, configured in accordance with certain embodiments of the present disclosure.

FIG. 13 illustrates an example system 1300 to perform spatially adaptive tone mapping (SATM) with dynamic brightness and contrast control, configured in accordance with certain embodiments of the present disclosure. In some embodiments, system 1300 comprises a platform 1310 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart tablet, smart television), mobile internet device (MID), messaging device, data communication device, and so forth. Any combination of different devices may be used in certain embodiments.

In some embodiments, platform 1310 may comprise any combination of a processor 1320, a memory 1330, SATM system 102, a network interface 1340, an input/output (I/O) system 1350, an HDR camera 110, a display element 112, a user interface 1360 and a storage system 1370. As can be further seen, a bus and/or interconnect 1392 is also provided to allow for communication between the various components listed above and/or other components not shown. Platform 1310 can be coupled to a network 1394 through network interface 1340 to allow for communications with other computing devices, platforms or resources. Other componentry and functionality not reflected in the block diagram of FIG. 13 will be apparent in light of this disclosure, and it will be appreciated that other embodiments are not limited to any particular hardware configuration.

Processor 1320 can be any suitable processor, and may include one or more coprocessors or controllers, such as an audio processor or a graphics processing unit, to assist in control and processing operations associated with system 1300. In some embodiments, the processor 1320 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1320 may be implemented as a complex instruction set computer (CISC) or a reduced instruction set computer (RISC) processor. In some embodiments, processor 1320 may be configured as an x86 instruction set compatible processor.

Memory 1330 can be implemented using any suitable type of digital storage including, for example, flash memory and/or random access memory (RAM). In some embodiments, the memory 1330 may include various layers of memory hierarchy and/or memory caches as are known to those of skill in the art. Memory 1330 may be implemented as a volatile memory device such as, but not limited to, a RAM, dynamic RAM (DRAM), or static RAM (SRAM) device. Storage system 1370 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1370 may comprise technology to increase the storage performance enhanced protection for valuable digital media when multiple hard drives are included.

Processor 1320 may be configured to execute an Operating System (OS) 1380 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1300, and therefore may also be implemented using any suitable existing or subsequently-developed platform.

Network interface circuit 1340 can be any appropriate network chip or chipset which allows for wired and/or wireless connection between other components of computer system 1300 and/or network 1394, thereby enabling system 1300 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1350 may be configured to interface between various I/O devices and other components of computer system 1300. I/O devices may include, but not be limited to an HDR camera 110, a display element 112, a user interface 1360, and other devices not shown such as a keyboard, mouse, microphone, speaker, etc.

I/O system 1350 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1320 or any chipset of platform 1310. In some embodiments, display element 112 may comprise any television type monitor or display. Display element 112 may comprise, for example, a computer display screen, touchscreen display, video monitor, television-like device, and/or a television. Display element 112 may be digital and/or analog. Under the control of the OS 1380 (or one or more software applications), platform 1310 may display images on display element 112. The images may be provided by HDR camera 110 and processed in accordance with SATM techniques, as described herein.

It will be appreciated that in some embodiments, the various components of the system 1300 may be combined or integrated in a system-on-a-chip (SoC) architecture. In some embodiments, the components may be hardware components, firmware components, software components or any suitable combination of hardware, firmware or software.

Spatially adaptive tone mapping system 102 is configured to perform dynamic range compression of an HDR image, with dynamic brightness and contrast control, using techniques that are performed partially in the logarithm domain and partially in the linear domain, to better preserve image details while providing contrast reduction. This tone mapping, or range compression, enables HDR images to be displayed on devices that are more limited in providing lower dynamic range capabilities. Spatially adaptive tone mapping system 102 may include any or all of the components illustrated in FIGS. 2, 4, 5, and 7, described above. Spatially adaptive tone mapping system 102 can be implemented or otherwise used in conjunction with a variety of suitable software and/or hardware that is coupled to or that otherwise forms a part of platform 1310. Spatially adaptive tone mapping system 102 can additionally or alternatively be implemented or otherwise used in conjunction with user I/O devices that are capable of providing information to, and receiving information and commands from, a user. These I/O devices may include display element 112, and other devices collectively referred to as user interface 1360. In some embodiments, user interface 1360 may include a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, SATM system 102 may be installed local to system 1300, as shown in the example embodiment of FIG. 13. Alternatively, system 1300 can be implemented in a client-server arrangement wherein at least some functionality associated with these circuits is provided to system 1300 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1394 or remotely coupled to network 1394 by one or more other networks and/or communication channels. In some cases access to resources on a given network or computing system may require credentials such as usernames, passwords, and/or compliance with any other suitable security mechanism.

In various embodiments, system 1300 may be implemented as a wireless system, a wired system, or a combination of both. When implemented as a wireless system, system 1300 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1300 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the SATM methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1394. In other embodiments, the functionalities disclosed herein can be incorporated into other software applications, such as image analysis applications, image editing applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1300 may comprise additional, fewer, or alternative subcomponents as compared to those included in the example embodiment of FIG. 13.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for brightness control of spatially adaptive tone mapping (SATM). The method comprises: converting luminance data, associated with pixels from a received image, to a logarithm domain; decomposing the logarithm domain luminance data into a base layer, and one or more detail layers; adjusting amplitudes of data in each of the layers, to map the amplitude data into a selected range; converting the adjusted layers from the logarithm domain to a linear domain; calculating a tone compression parameter based on statistics of the adjusted log domain base layer, the statistics associated with brightness of the received image; and applying a global tone compression function, based on the tone compression parameter, to the converted linear domain base layer to generate compressed linear domain layers.

Example 2 includes the subject matter of Example 1, further comprising generating compressed luminance data based on a multiplicative product of the compressed linear domain layers.

Example 3 includes the subject matter of Examples 1 or 2, further comprising generating a compressed output image based on scaling of red-green-blue (RGB) data from the received image by a ratio of the compressed luminance data to the luminance data from the received image.

Example 4 includes the subject matter of any of Examples 1-3, wherein the statistics associated with brightness are based on an average of samples of the adjusted log domain base layer.

Example 5 includes the subject matter of any of Examples 1-4, wherein the statistics are further associated with contrast of the received image.

Example 6 includes the subject matter of any of Examples 1-5, wherein the statistics associated with contrast are based on a difference between a selected upper percentile threshold and a selected lower percentile threshold of samples of the adjusted log domain base layer.

Example 7 includes the subject matter of any of Examples 1-6, wherein the selected upper percentile threshold is in the percentile range of 68 to 72, and the selected lower percentile threshold is in the percentile range of 28 to 32.

Example 8 includes the subject matter of any of Examples 1-7, wherein the received image is a High Dynamic Range (HDR) image.

Example 9 is a system for brightness control of spatially adaptive tone mapping (SATM). The system comprising: a logarithm domain conversion circuit to convert luminance data, associated with pixels from a received image, to a logarithm domain; an edge-aware filter circuit to decompose the logarithm domain luminance data into a base layer, and one or more detail layers; an amplitude adjustment circuit to shift and scale the amplitudes of the base layer and to scale the amplitudes of the detail layers, to map the amplitude data into a selected range; a linear-conversion circuit to convert the adjusted layers from the logarithm domain to a linear domain; a tone compression parameter (TCP) adjustment circuit to calculate a TCP based on statistics of the adjusted log domain base layer, the statistics associated with brightness of the received image; and a global tone compression circuit to apply a global tone compression function, based on the tone compression parameter, to the converted linear domain base layer to generate compressed linear domain layers.

Example 10 includes the subject matter of Example 9, further comprising a compressed luminance data reconstruction circuit to generate compressed luminance data based on a multiplicative product of the compressed linear domain layers.

Example 11 includes the subject matter of Examples 9 or 10, further comprising an output generation circuit to generate a compressed output image based on scaling of red-green-blue (RGB) data from the received image by a ratio of the compressed luminance data to the luminance data from the received image.

Example 12 includes the subject matter of any of Examples 9-11, wherein the statistics associated with brightness are based on an average of samples of the adjusted log domain base layer.

Example 13 includes the subject matter of any of Examples 9-12, wherein the statistics are further associated with contrast of the received image.

Example 14 includes the subject matter of any of Examples 9-13, wherein the statistics associated with contrast are based on a difference between a selected upper percentile threshold and a selected lower percentile threshold of samples of the adjusted log domain base layer.

Example 15 includes the subject matter of any of Examples 9-14, wherein the selected upper percentile threshold is in the percentile range of 68 to 72, and the selected lower percentile threshold is in the percentile range of 28 to 32.

Example 16 includes the subject matter of any of Examples 9-15, wherein the received image is a High Dynamic Range (HDR) image.

Example 17 is at least one non-transitory computer readable storage medium having instructions encoded thereon that, when executed by one or more processors, result in the following operations for brightness control of spatially adaptive tone mapping (SATM). The operations comprise: converting luminance data, associated with pixels from a received image, to a logarithm domain; decomposing the logarithm domain luminance data into a base layer, and one or more detail layers; adjusting amplitudes of data in each of the layers, the adjusting to shift and scale the amplitudes of the base layer and to scale the amplitudes of the detail layers, to map the amplitude data into a selected range; converting the adjusted layers from the logarithm domain to a linear domain; calculating a tone compression parameter based on statistics of the adjusted log domain base layer, the statistics associated with brightness of the received image; and applying a global tone compression function, based on the tone compression parameter, to the converted linear domain base layer to generate compressed linear domain layers.

Example 18 includes the subject matter of Example 17, the operations further comprising generating compressed luminance data based on a multiplicative product of the compressed linear domain layers.

Example 19 includes the subject matter of Examples 17 or 18, the operations further comprising generating a compressed output image based on scaling of red-green-blue (RGB) data from the received image by a ratio of the compressed luminance data to the luminance data from the received image.

Example 20 includes the subject matter of any of Examples 17-19, wherein the statistics associated with brightness are based on an average of samples of the adjusted log domain base layer.

Example 21 includes the subject matter of any of Examples 17-20, wherein the statistics are further associated with contrast of the received image.

Example 22 includes the subject matter of any of Examples 17-21, wherein the statistics associated with contrast are based on a difference between a selected upper percentile threshold and a selected lower percentile threshold of samples of the adjusted log domain base layer.

Example 23 includes the subject matter of any of Examples 17-22, wherein the selected upper percentile threshold is in the percentile range of 68 to 72, and the selected lower percentile threshold is in the percentile range of 28 to 32.

Example 24 includes the subject matter of any of Examples 17-23, wherein the received image is a High Dynamic Range (HDR) image.

Example 25 is a system for brightness control of spatially adaptive tone mapping (SATM). The system comprises: means for converting luminance data, associated with pixels from a received image, to a logarithm domain; means for decomposing the logarithm domain luminance data into a base layer, and one or more detail layers; means for adjusting amplitudes of data in each of the layers, to map the amplitude data into a selected range; means for converting the adjusted layers from the logarithm domain to a linear domain; means for calculating a tone compression parameter based on statistics of the adjusted log domain base layer, the statistics associated with brightness of the received image; and means for applying by the processor, a global tone compression function, based on the tone compression parameter, to the converted linear domain base layer to generate compressed linear domain layers.

Example 26 includes the subject matter of Example 25, further comprising means for generating compressed luminance data based on a multiplicative product of the compressed linear domain layers.

Example 27 includes the subject matter of Examples 25 or 26, further comprising means for generating a compressed output image based on scaling of red-green-blue (RGB) data from the received image by a ratio of the compressed luminance data to the luminance data from the received image.

Example 28 includes the subject matter of any of Examples 25-27, wherein the statistics associated with brightness are based on an average of samples of the adjusted log domain base layer.

Example 29 includes the subject matter of any of Examples 25-28, wherein the statistics are further associated with contrast of the received image.

Example 30 includes the subject matter of any of Examples 25-29, wherein the statistics associated with contrast are based on a difference between a selected upper percentile threshold and a selected lower percentile threshold of samples of the adjusted log domain base layer.

Example 31 includes the subject matter of any of Examples 25-30, wherein the selected upper percentile threshold is in the percentile range of 68 to 72, and the selected lower percentile threshold is in the percentile range of 28 to 32.

Example 32 includes the subject matter of any of Examples 25-31, wherein the received image is a High Dynamic Range (HDR) image.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for brightness control of spatially adaptive tone mapping (SATM), the method comprising:
    converting, by a processor, luminance data, associated with pixels from a received image, to a logarithm domain;
    decomposing, by the processor, the logarithm domain luminance data into a base layer, and one or more detail layers;
    adjusting, by the processor, amplitudes of data in each of the layers, to map the amplitude data into a selected range;
    converting, by the processor, the adjusted layers from the logarithm domain to a linear domain;
    calculating, by the processor, a tone compression parameter based on statistics of the adjusted log domain base layer, the statistics associated with brightness of the received image; and
    applying, by the processor, a global tone compression function, based on the tone compression parameter (tcp), to the converted linear domain base layer (B) to generate a compressed linear domain base layer (Bc), according to the equation $Bc=(\log(B+tcp)-\log(tcp))/(\log(1+tcp)-\log(tcp))$.

2. The method of claim 1, further comprising generating compressed luminance data based on a multiplicative product of the compressed linear domain base layer and a compressed linear domain detail layer.

3. The method of claim 2, further comprising generating a compressed output image based on scaling of red-green-blue (RGB) data from the received image by a ratio of the compressed luminance data to the luminance data from the received image.

4. The method of claim 1, wherein the statistics associated with brightness are based on an average of samples of the adjusted log domain base layer.

5. The method of claim 1, wherein the statistics are further associated with contrast of the received image.

6. The method of claim 5, wherein the statistics associated with contrast are based on a difference between a selected upper percentile threshold and a selected lower percentile threshold of samples of the adjusted log domain base layer.

7. The method of claim 6, wherein the selected upper percentile threshold is in the percentile range of 68 to 72, and the selected lower percentile threshold is in the percentile range of 28 to 32.

8. The method of claim 1, wherein the received image is a High Dynamic Range (HDR) image.

9. A system for brightness control of spatially adaptive tone mapping (SATM), the system comprising:
    a logarithm domain conversion circuit to convert luminance data, associated with pixels from a received image, to a logarithm domain;
    an edge-aware filter circuit to decompose the logarithm domain luminance data into a base layer, and one or more detail layers;
    an amplitude adjustment circuit to shift and scale the amplitudes of the base layer and to scale the amplitudes of the detail layers, to map the amplitude data into a selected range;
    a linear-conversion circuit to convert the adjusted layers from the logarithm domain to a linear domain;

a tone compression parameter (TCP) adjustment circuit to calculate a TCP based on statistics of the adjusted log domain base layer, the statistics associated with brightness of the received image; and a global tone compression circuit to apply a global tone compression function, based on the tone compression parameter (tcp), to the converted linear domain base layer (B) to generate a compressed linear domain base layer (Bc), according to the equation Bc=(log(B+tcp)−log(tcp))/(log(1+tcp)−log(tcp)).

10. The system of claim 9, further comprising a compressed luminance data reconstruction circuit to generate compressed luminance data based on a multiplicative product of the compressed linear domain base layer and a compressed linear domain detail layer.

11. The system of claim 10, further comprising an output generation circuit to generate a compressed output image based on scaling of red-green-blue (RGB) data from the received image by a ratio of the compressed luminance data to the luminance data from the received image.

12. The system of claim 9, wherein the statistics associated with brightness are based on an average of samples of the adjusted log domain base layer.

13. The system of claim 9, wherein the statistics are further associated with contrast of the received image.

14. The system of claim 13, wherein the statistics associated with contrast are based on a difference between a selected upper percentile threshold and a selected lower percentile threshold of samples of the adjusted log domain base layer.

15. The system of claim 14, wherein the selected upper percentile threshold is in the percentile range of 68 to 72, and the selected lower percentile threshold is in the percentile range of 28 to 32.

16. The system of claim 9, wherein the received image is a High Dynamic Range (HDR) image.

17. At least one non-transitory computer readable storage medium having instructions encoded thereon that, when executed by one or more processors, result in the following operations for brightness control of spatially adaptive tone mapping (SATM), the operations comprising:

converting luminance data, associated with pixels from a received image, to a logarithm domain;

decomposing the logarithm domain luminance data into a base layer, and one or more detail layers;

adjusting amplitudes of data in each of the layers, the adjusting to shift and scale the amplitudes of the base layer and to scale the amplitudes of the detail layers, to map the amplitude data into a selected range;

converting the adjusted layers from the logarithm domain to a linear domain;

calculating a tone compression parameter based on statistics of the adjusted log domain base layer, the statistics associated with brightness of the received image; and applying a global tone compression function, based on the tone compression parameter (tcp), to the converted linear domain base layer (B) to generate a compressed linear domain base layer (Bc), according to the equation Bc=(log(B+tcp)−log(tcp))/(log(1+tcp)−log(tcp)).

18. The computer readable storage medium of claim 17, the operations further comprising generating compressed luminance data based on a multiplicative product of the compressed linear domain base layer and a compressed linear domain detail layer.

19. The computer readable storage medium of claim 18, the operations further comprising generating a compressed output image based on scaling of red-green-blue (RGB) data from the received image by a ratio of the compressed luminance data to the luminance data from the received image.

20. The computer readable storage medium of claim 17, wherein the statistics associated with brightness are based on an average of samples of the adjusted log domain base layer.

21. The computer readable storage medium of claim 17, wherein the statistics are further associated with contrast of the received image.

22. The computer readable storage medium of claim 21, wherein the statistics associated with contrast are based on a difference between a selected upper percentile threshold and a selected lower percentile threshold of samples of the adjusted log domain base layer.

23. The computer readable storage medium of claim 22, wherein the selected upper percentile threshold is in the percentile range of 68 to 72, and the selected lower percentile threshold is in the percentile range of 28 to 32.

24. The computer readable storage medium of claim 17, wherein the received image is a High Dynamic Range (HDR) image.

25. A computer program product including at least one non-transitory computer readable storage medium having instructions encoded thereon that, when executed by one or more processors, causes a process to be carried out for brightness control of spatially adaptive tone mapping (SATM), the process comprising:

converting luminance data, associated with pixels from a received image, to a logarithm domain;

decomposing the logarithm domain luminance data into a base layer, and one or more detail layers;

adjusting amplitudes of data in each of the layers, to map the amplitude data into a selected range;

converting the adjusted layers from the logarithm domain to a linear domain;

calculating a tone compression parameter based on statistics of the adjusted log domain base layer, the statistics associated with brightness of the received image and contrast of the received image, wherein the statistics associated with contrast are based on a difference between a selected upper percentile threshold and a selected lower percentile threshold of a histogram of samples of the adjusted log domain base layer, and wherein the selected upper percentile threshold is in the percentile range of 68 to 72, and the selected lower percentile threshold is in the percentile range of 28 to 32; and applying a global tone compression function, based on the tone compression parameter, to the converted linear domain base layer to generate compressed linear domain layers.

26. The computer program product of claim 25, the process further comprising generating compressed luminance data based on a multiplicative product of the compressed linear domain layers and generating a compressed output image based on scaling of red-green-blue (RGB) data from the received image by a ratio of the compressed luminance data to the luminance data from the received image.

* * * * *